United States Patent [19]

Weber et al.

[11] Patent Number: 4,975,943
[45] Date of Patent: Dec. 4, 1990

[54] TELEPHONE SET HAVING OUTBOUND CALL RESTRICTION LOGIC CIRCUIT

[76] Inventors: J. Floyd Weber, 1411 S. 12th Ave., Yakima, Wash. 98902; Gregg M. Weber, 12534 Northpark Ave. North, Seattle, Wash. 98133

[21] Appl. No.: 379,466

[22] Filed: Jul. 13, 1989

[51] Int. Cl.[5] .................................... H04M 1/66
[52] U.S. Cl. ...................... 379/200; 379/361
[58] Field of Search ............... 379/188, 199, 200, 368, 379/201, 361

[56] References Cited

U.S. PATENT DOCUMENTS

| | | | |
|---|---|---|---|
| 1,287,099 | 12/1918 | Reubenstone | 379/130 |
| 2,433,366 | 12/1947 | Hersey | 379/367 |
| 3,874,164 | 4/1975 | Bell | 379/110 |
| 3,920,936 | 11/1975 | Mogtader | 379/131 |
| 4,012,602 | 3/1977 | Jackson | 379/200 |
| 4,251,692 | 2/1981 | Waldman | 379/131 |
| 4,543,452 | 9/1985 | Ippen | 379/131 |
| 4,585,904 | 4/1986 | Mincone et al. | 379/88 |
| 4,791,667 | 12/1988 | Havel | 379/200 X |

*Primary Examiner*—James L. Dwyer
*Attorney, Agent, or Firm*—Larry A. Jackson

[57] ABSTRACT

In an extension (or second) telephone set, a logic circuit powered by standard line current is connected between the standard telephone key encoder that receives and encodes the user entered key dialing digits and a dialing signal converter that produces dialing pulses on the phone line in response to the encoder. The converter accepts binary encoded digits from the encoder along with a strobe signal associated with each entered binary encoded dialing digit. Logic gates assisted by other digital circuitry determine whether the initial digit of the series is authorized and, of so, allow the associated strobe signal to be transmitted from the encoder to the outpulsing converter and thereafter allow a predetermined maximum number of digits of the series to be communicated to the converter to complete the local outbound call dialing.

20 Claims, 2 Drawing Sheets

TELEPHONE SET HAVING OUTBOUND CALL RESTRICTION LOGIC CIRCUIT

BACKGROUND OF THE INVENTION

The present invention relates to telephone sets suitable as an extension or second phone designed for direct connection to standard central station telephone lines, and having built-in logic circuitry for restricting the type and number of digits of an outbound call.

There is often a need in the home or small business for a second or extension phone that is restricted to dialing local calls. For example, in a home, family or recreation room frequented by guests of the owner an extension phone is often used by guests to make long distance toll calls that can mount up to large long distance telephone bills at the end of the month. Similarly, small businesses not equipped with sophisticated PBXs or computer control units, often have extension phones available to customers in a reception area. When such phones are connected directly to the central station telephone line or lines, unauthorized long distance calls may be placed without the consent of the business owner.

Yet, it is often desired in home and small business phone installations to provide that extra extension phone in public or quasi-public areas for enabling guests, customers, and other members of the public to place local, non-toll, outbound calls as well as allowing the owner or resident to receive all incoming calls at that particular phone extension.

While outbound call restriction systems are known in the art, for example, reference is made to U.S. Pat. No. 4,251,692 for TELEPHONE CALL RESTRICTING APPARATUS, issued to Herbert H. Waldman; U.S. Pat. No. 3,920,936 for TOLLCALL RESTRICTION SYSTEM, issued to Charles S. Mogtader; and U.S. Pat. No. 4,585,904 for PROGRAMMABLE COMPUTERIZED TELEPHONE CALL COST METERING DEVICE, issued to Mincone, et al., these and other call restricting systems are of a generally sophisticated, computerized function of a larger PBX or other local or central computer control unit that interfaces the central station lines with the individual telephone sets. Other examples of call restrictor and dialing detection circuits are set forth in U.S. Pat. No. 4,012,602 issued Mar. 15, 1977, to Joseph Monroe Jackson, and U.S. Pat. No. 4,791,667 issued Dec. 13, 1988, to inventor Carol Havel. Such PBXs and other computerized control units are cost effective for the moderate to large business installations, but are too costly and complex for the one or two line residential or small business service. Other call restrictors are of a different type of mechanical or electro-mechanical type such as exhibited by U.S. Pat. Nos. 3,874,164; 4,543,452; 1,287,099; and 2,433,366.

Further examples of restrictions on extension phones include keyed locks on the rotary dial and other types of electro-mechanical devices that can be accessed with a key or proper positioning of a control switch. These types of mechanical and electro-mechanical restrictors are often undesirable because they either make the use of the phone more difficult for the authorized person, or convey an impression of distrust to guests or customers.

It is therefore an object of the present invention to provide a modified standard telephone set of the type commonly connected directly to the tip and ring leads of the standard central station line in which a built-in call restriction logic circuit prevents all but local (non-toll) outbound calls. Furthermore, it is an object of the present invention to provide such a phone set suitable as an extension or second phone in the home or small business in which the call restriction logic circuit is capable of being built-in to the existing housing of the phone set and for this purpose the logic is designed to require only a small number of logic circuit components; is powered solely by current on the phone line supplied by central station; exhibits extraordinary reliability over a long period of use; is difficult to circumvent even by opening the housing of the phone set and has multiple call restriction modes to prevent different types of unauthorized outbound dialing.

SUMMARY OF THE INVENTION

These and other objects, features and advantages of the invention are achieved by modifying a standard extension (or second phone) set of the type that connects directly to a central station, to incorporate a built-in logic circuit having outbound call (dialing) restriction. The added logic circuit is connected between a dialing encoder and a dialing signal converter for (i) selectively gating a digit enabling signal between the encoder and the converter only when the first of a series of outbound call digits belongs to a predetermined set of authorized first digits; and (ii) selectively gating the digit enabling signals to allow up to a predetermined maximum number of outbound dialing digits corresponding to the total number of digits of a local call.

In the preferred embodiment, the logic circuit is powered by standard line current and is connected between the standard telephone key encoder that receives and encodes the user entered key pad dial digits and a dialing signal converter that produces line dialing pulses in response to the encoder. The latter accepts binary encoded digits one at a time from the encoder along with an enabling strobe signal associated with each encoded digit. Logic gates assisted by a flip-flop (bistable multivibrator) determine whether the initial digit of the series is authorized and, if so, allow the associated strobe signal to be transmitted from the encoder to the outpulsing converter and thereafter allow all digits of the series to pass the associated strobe pulse signal to complete the series of digits that form the local outbound call. Furthermore, after the first strobe signal of an authorized first digit is passed to the converter, then the transmission of successive such strobe pulse signals is registered in a counter. When a predetermined maximum (depending on service available in a given geographical area) of such strobe pulse signals is accumulated in the counter, a logic gate blocks the transmission of further strobe signals of that series. This counting function effectively limits the number of dialed digits to the predetermined maximum, such as seven digits for most United States phone services, which is sufficient to place most local calls.

Other features and advantages of the invention, including its preferred embodiments, will become apparent to those skilled in the art from the following detailed description and appended drawings.

DESCRIPTION OF PREFERRED EMBODIMENT

The preferred embodiment of the invention is a modified standard telephone set having call restriction logic permanently built-in to the telephone set which, when so modified, appears to the user as an ordinary telephone. More particularly, FIGS. 1 and 2 together form the modified telephone set 10 (base and hand set not shown) for local outbound calls only, and for direct connection to the tip and ring pair of a standard central station telephone line service.

Figure 1:
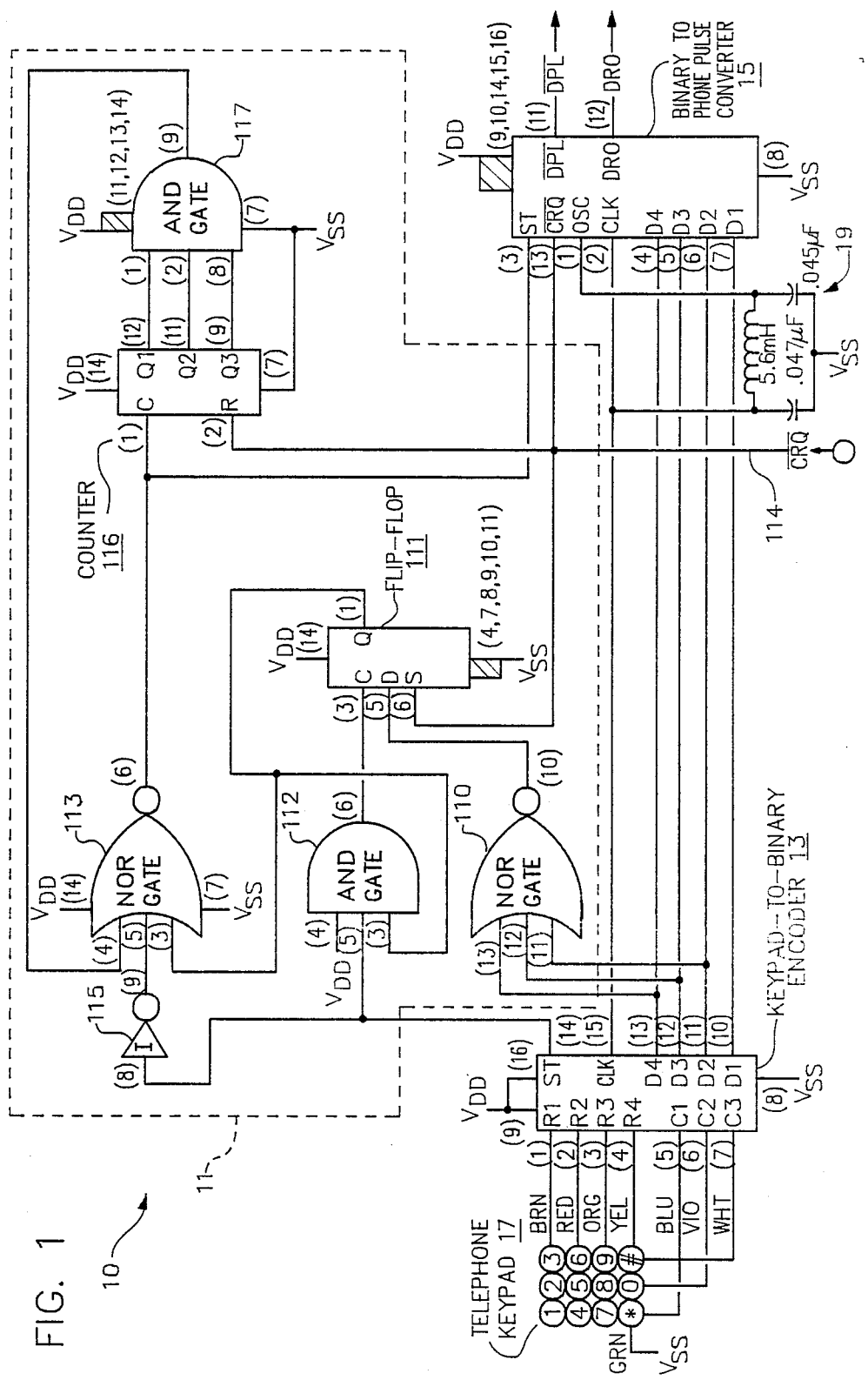
FIG. 1 is a detailed schematic diagram of a preferred implementation of the logic circuit that controls the transmission of digit enabling strobe pulse signals between a key-pad-to-binary encoder and a binary-to-phone pulse converter.
Figure 2:
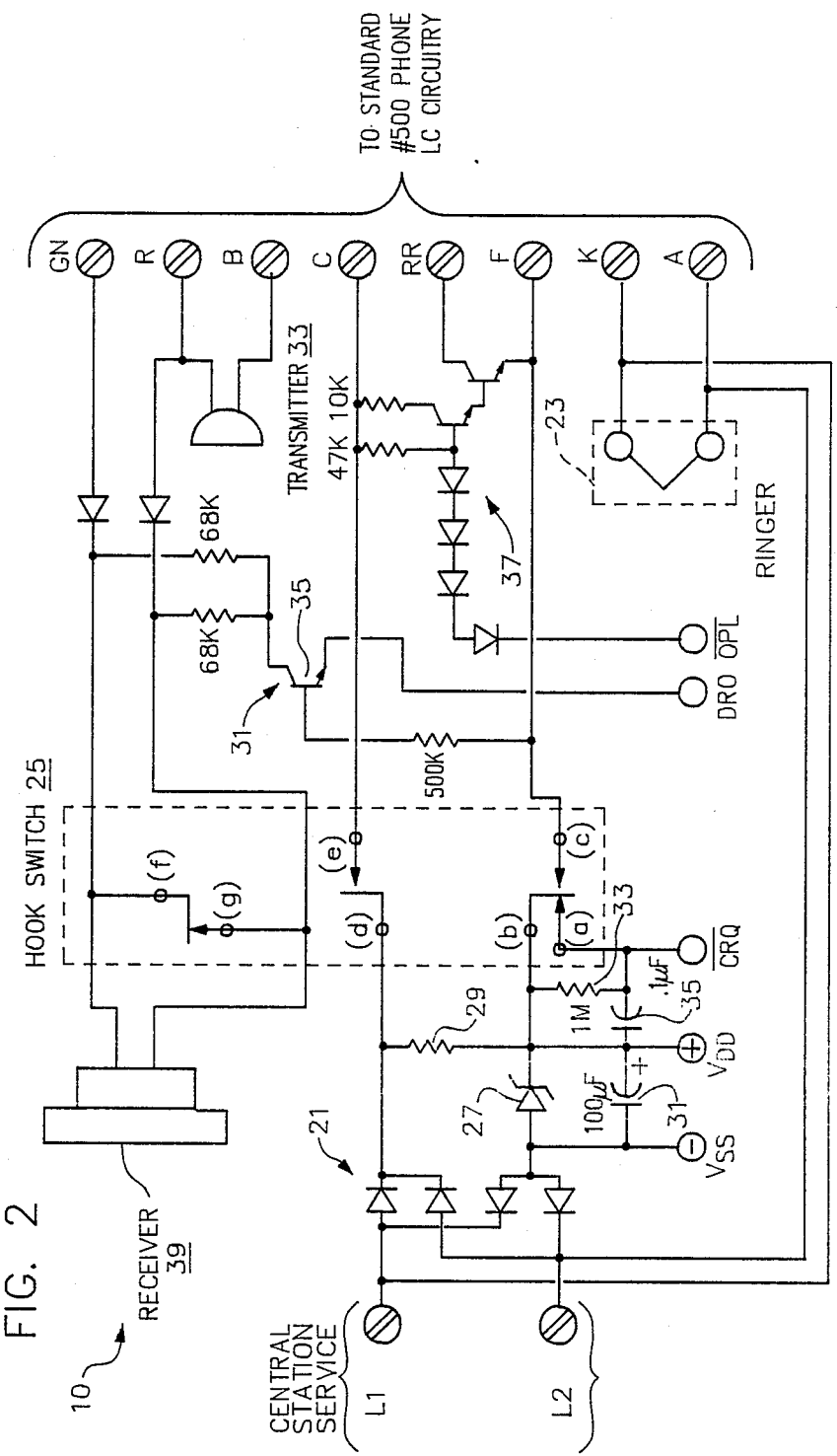
FIG. 2 is a detailed schematic diagram of a conventional telephone set, suitable for use as the restricted extension or second phone in accordance with the invention, and is connectable directly to the standard central station tip and ring leads (L1 and L2) of the central station phone line, as well as to the logic circuitry of FIG. 1 at the terminals identified as $V_{SS}$, $V_{DD}$, $\overline{CRQ}$, DRO and $\overline{OPL}$.

In FIG. 2, the tip and ring pair are identified as leads L1 and L2 and will be referred to as such in the following description. Relatively low voltage, direct current power for the call restriction logic circuitry of FIG. 1 as well as for other circuit elements of the components of FIG. 1 is derived from the line current that appears on the L1-L2 telephone service leads from the central service facility. This is accomplished as shown in FIG. 2 by a capacitor filtered Zener diode 27 dc supply network connected to the telephone leads L1 and L2 in the lower left hand portion of FIG. 2, for supplying + to − direct current voltage as indicated by the terminals $V_{DD}$ and $V_{SS}$.

More particularly now with reference to FIG. 1, the built-in call restriction logic is provided by circuit 11 circumscribed by the dotted line and interconnected between a key-pad-to-binary encoder 13 and a binary-to-phone-pulse converter 15. A telephone key pad 17 provides a matrix of user key switches connected as input leads (1) through (7) to encoder 13. Key-pad-to-binary encoder 13, binary-to-phone-pulse converter 15 and telephone key pad 17 are conventional components used in a standard telephone set such as sets interchangeable with the AT&T type 500 series telephone manufactured by AT&T Company. In the standard telephone, encoder 13 and converter 15 are either combined as a single integrated LSI or separately supplied as shown in FIG. 1 as separate LSIs. In either case, the binary encoded digits entered by the user on key pad 17 are directly coupled from encoder 13 to converter 15 and appear as a series of dialing-out pulses on the central station service lines L1-L2 via interconnect lead $\overline{OPL}$ (outpulsing) as illustrated in FIG. 2 and described in greater detail below.

In accordance with the preferred form of the invention, call restriction logic circuit 11 is interposed between key pad to binary encoder 13 and binary to phone pulse converter 15 as shown in FIG. 1 in order to selectively gate an enabling strobe signal, identified by the symbol ST, so that only certain binary encoded dialing digits are effectively transmitted or loaded into converter 15, and hence subsequently applied to the service line L1 and L2 as dialing pulses. In general, logic circuit 11 accomplishes this control function by (i) sensing whether the initial digit of a series of outbound call digits, encoded at the output of encoder 13, represent a group or set of authorized digits, in this case any digit other than 1 or 0 is authorized, and selectively passing the associated strobe signal ST from encoder 13 through logic circuit 11 to converter 15; and (ii) counting the number of transmitted strobe pulse signals in a counter circuit to limit the maximum number of binary encoded digits passed from encoder 13 to converter 15 to a predetermined maximum, such as seven digits.

In the presently preferred embodiment, a maximum of seven digits is allowed to pass to converter 15, representing the length of a typical local telephone number. However, it will be appreciated that this maximum permissible number may be more (such as for accommodating a #9 prefix to obtain an outside line, or where the available service for the geographical area requires eight or more digits for even local calls), or fewer than seven (for some special service areas). In this disclosed embodiment, when seven digits have been entered on key pad 17, the counter in logic circuit 11 gates off the pulse strobe signals associated with subsequent digits so that entry of digits in excess of seven are not effectively coupled into converter 15 and hence do not appear as out-pulsing on the telephone line L1-L2.

Therefore, in essence, call restriction logic circuit 11 causes the outbound calling function of the modified telephone set to be normally dormant, that is asleep, until the first digit of a series entered on key pad 17 is an authorized digit, in this instance, any digit other than 0 (which would allow an operator assisted long distance call), or 1 (which is required for most phone services to reach an out-of-area toll call destination).

Upon sensing an authorized first digit, the dialing function of the modified telephone becomes active, i.e., awakens, and allows that first authorized digit as well as subsequent digits (which may now include 0 and/or 1) up to seven to be effectively passed on to converter 15 for outbound dialing on the service line. The seventh digit of the series, when entered on key pad 17 by encoder 13, causes a counter of logic circuit 11 to register seven strobe pulse counts which thereupon blocks succeeding strobe pulses ST associated with the eighth and more digits, thus restricting the outbound dialing series to seven digits.

Now, with more specific reference to FIG. 1, the preferred embodiment of call restriction logic circuit 11 is shown to have a first gate 110, in this instance providing NOR logic with three input pins (11), (12) and (13) connected to the bit outputs D2, D3 and D4 of the four bit binary encoded outputs (D1-D4) of encoder 13. NOR gate 110 cooperates with a flip-flop (bistable multivibrator) 111 and an AND gate 112 to sense whether the first of the series of the digits entered on key pad 17 belongs to the predetermined authorized set of first digits.

For this purpose, the output (10) of NOR gate 110 is connected to the data (D) input pin (5) of flip-flop 111, and an output of AND gate 112 is connected to the (C) input pin (3) of flip-flop 111. The Q output (1) of flip-flop 111 is connected in feedback to one pin (3) of two inputs of AND gate 112 and also to one pin (3) of three inputs of a second NOR gate 113 which selectively gates strobe pulses ST to converter 15.

Initially, flip-flop 111 is placed in the set state by $\overline{CRQ}$ (not call request) received over line 114 from the hook CRQ (not call request) switch of the telephone set component shown in FIG. 2. In this set state, the Q (1) output of flip-flop 111 is normally high and thereby enables a high going signal to pass through AND gate 112 and initially holds NOR gate 113 closed until an authorized first digit is entered.

The second NOR gate 113 serves as the primary gate control for digit enabling strobe pulse signals ST outputted on pin (14) of encoder 13. More particularly, the ST or strobe output signal from encoder 13 is connected through an inverter 115 having input pin (8) and an output pin (9) to another one of the three inputs at pin (5) of NOR gate 113. The output of NOR gate 113 appearing at pin (6) is connected to the strobe input at pin (3) of converter 15. Thus, NOR gate 113 selectively gates strobe pulses from encoder 13 to converter 15, enabling the associated binary encoded digit to be converted and applied to the service line as an outbound dialing pulse signal.

The second NOR gate 113 is enabled to transmit the strobe pulses only when all three inputs, including the strobe pulse signal received via inverter 115 are at logic low. Thus, the Q output at pin (1) of flip-flop 111 must switch low before NOR gate 113 transmits the strobe signals and likewise the third input pin (4) which receives a state signal from a counter control circuit including counter 116 and an AND gate 117, must be low in order for NOR gate 113 to transmit the inverted low going strobe pulse signals from inverter 115 to converter 15. The counter circuitry, including counter 116 and AND gate 117, determines when a predetermined maximum number of outbound digits have been effectively encoded and converted by counting the associated number of strobe pulse signals transmitted by NOR gate 113 and applied to a count input pin (1) of counter 116. Upon reaching a count of seven, representing the seventh strobe pulse of the associated seven digits, counter 116 produces a binary count at outputs Q1, Q2 and Q3 appearing on pins (12), (11) and (9), respectively. This particular count state is represented by all of these outputs going to logic high on the seventh count which in turn causes AND gate 117 to go high at an output pin (9). The high state of pin (9) of the AND gate 117 is fed back to the pin (4) input of NOR gate 113 blocking further transmission of strobe pulses. This strobe blocking condition of counter 116 is relieved by a reset signal applied at pin (2) whenever a $\overline{CRQ}$ signal goes high to reset counter 116 to its nominal or 0 count state which occurs when the handset is returned to the on-hook condition.

Key pad to binary encoder 13 is, as mentioned, a commercially available LSI IC and, in this instance, a component available from Motorola Corporation as MC14419 has been used. This particular component is a CMOS IC that is connected at inputs R1-R4 and C1-C3 represented by pins (1) through (7) as respectively rows and columns of the switch array of key pad 17 as illustrated. When encoder 13 receives particular logic high signals at a combination of the row inputs R1-R4 and column inputs C1-C3 from key pad 17, the encoder internally interprets the combination in a manner well known per se, to identify the particular digit key that has been actuated on key pad 17. Having identified the digit key, and let us assume for a moment that key #5 has been pressed, encoder 13 determines that digit 5 has been entered on key pad 17. Also internally of encoder 13 and operating in a manner well know per se, the identified input digit is then encoded into a four bit binary signal appearing at binary output bits D1-D4 at pins (10), (11), (12) and (13), respectively. In this particular commercial encoder, 80 milliseconds after a key has been pressed on key pad 17, and the identification and binary encoding has settled, a strobe pulse ST is produced at output pin (14). It is this output strobe pulse that is applied to one of the inputs of AND gate 112 and after inversion by inverter 115 to the middle input pin (5) of NOR gate 113 to effect the logic functions described above in association with each dialing digit entered on key pad 17. Another output identified as clock, or CLK, appearing at pin (15) is connected to a CLK input at pin (2) of converter (15) for effecting a hand shaking operation in conjunction with an LC oscillator circuit 19, for synchronizing the internal operations of encoder 13 and converter 15.

The binary output bits D1-D4 of encoder 13 are connected to corresponding binary bit inputs D1-D4 at pins (7), (6), (5) and (4), respectively, of converter 15 as shown. Thus, it will be observed that all of the output pins of encoder 13 except the strobe signal line are connected directly across to the responsive inputs of converter 15.

Binary-to-phone pulse converter 15 is similarly a conventional component and, in this embodiment, a Motorola component MC14408 CMOS LSI IC is used. This binary-to-phone pulse converter 15 accepts the binary code at input bits D1-D4 and translates that binary encoded dialing digit into the proper sequence of outbound line dialing pulses issued at $\overline{OPL}$ at output pin 11. Accompanying the out-pulsing signal $\overline{OPL}$ is another signal identified as DRO or dial rotating output which appears at output pin (12) and which serves to suppress audible dialing fluctuations at the telephone set receiver during dialing.

Synchronizing the operations of encoder 13 and converter 15 is an LC network 19 connected with two capacitors fed by negative supply voltage $V_{SS}$ connected across an inductor which in turn is connected between an oscillator input pin (1) and a clock input pin (2) of converter 15. As mentioned above, the clock input pin (2) of converter 15 is also connected to the clock input pin (15) of encoder 13. This arrangement of the LC network 19 with the negative supply voltage $V_{SS}$ connected as shown and operating in a conventional manner causes the two circuits to operate in clocked synchronism at the oscillation frequency established by the LC network 19 so that converter 15 faithfully converts the binary encoded digit signals developed at encoder 13.

In FIG. 2, the standard circuitry for a telephone set 10 is shown including contacts for connecting the telephone set to the L1-L2 line pair of the central station service. Since the components of the telephone set of FIG. 2 are conventional and are shown here only for completeness, it is not necessary to discuss in detail the function and operation of each element. Thus, in brief, the L1-L2 contact terminals of the telephone set are connected as shown in parallel first to a diode bridge 21 and to a ringer 23. The output of the diode bridge 21 is connected to the multiple pole hook switch 25 which is actuated by the electro-mechanical switch that goes off hook when the hand set is removed from the base, or in one piece phones when the phone set is lifted off its resting surface or removed from a carrier. Between diode bridge 21 and hook switch 25 is a capacitance filtered, Zener diode regulated power supply tap network including Zener diode 27 connected in series with one of the service line leads and associated with a resistor 29 connected across the leads, a filter capacitor 31 connected Zener diode 27 and an RC filtering network consisting of a resistor 33 and a capacitor 35. The positive supply terminal $V_{DD}$ is provided by the junction between the cathode of diode 27 and capacitor 31, and the negative supply terminal $V_{SS}$ is provided at the junction between the anode of diode 27 and capacitor 31 as shown. The resistor 33 and capacitor 35 are connected as shown between the positive supply terminal and across one set of contacts (a) and (b) of hook switch 25 in which the (a) contact of the hook switch provides the $\overline{CRQ}$ signal to converter 15 and call restriction logic circuit 11 of FIG. 1. The $\overline{CRQ}$ signal, when at a logic high, represents not call request, in other words, on-hook, and when low, represents the off-hook or call request condition, signaling the circuit of FIG. 1 that a call is to be initiated.

The other contact (c) of hook switch 25 associated with contacts (a) and (b) provides for connecting the line that passes through Zener diode 27 to the downstream circuitry of the phone set including the out-pulsing diode-resistor-transistor network 37 and terminal F that in turn connects to the standard LC circuitry of the 500 series type phone (the LC circuitry has been omitted for clarity but corresponds to the conventional LC circuitry that is well known to those familiar with telephone engineering and series 500 type phone sets in particular. The middle set of contacts (d) and (e) similarly provide for connection of the upper lead of the line pair to the downstream circuitry including network 37 and to terminal C that goes to the standard LC phone circuitry. The uppermost contacts (g) and (f) of hook switch 25 remove a shunt across the receiver 39 when off-hook.

The leads that extend between receiver 39 and the shunt contacts (g) and (f) also are connected to a dialing suppression circuit 31 consisting of a transistor and biasing resistors and through blocking diodes to terminal GN of the LC circuitry and to terminal R and through the transmitter (mouthpiece) 33 and to terminal B of the LC circuitry. Suppression circuit 31, including transistor 35, responds to a DRO output signal from converter 15 and lowers the sensitivity of the receiver circuit whenever dialing pulses are being generated and applied across the line pair by means of diode transistor-resistor network 37 in response to the out-pulsing signal of $\overline{OPL}$ generated at output pin (11) of converter 15 (see FIG. 1). The remaining terminals of the circuit shown in FIG. 2, including terminals C, RR and F are connected again in a well known manner to the conventional LC circuitry of the standard 500 series type phone set.

OPERATION

Flip-flop 111 of the call restriction logic circuit 11 is switched to the set condition by the $\overline{CRQ}$ signal going on-hook. The set condition of flip-flop 111 is the initial or quiescent condition that precedes the outbound call. At the same time, the counter 116 of circuit 11 is reset to the nominal or zero state and in a conventional manner converter 15 is initialized at terminal 13 by the same $\overline{CRQ}$ signal going to the on-hook state.

To place a call, a user of the modified telephone set with call restriction will initially pick up the hand set and cause hook switch 25 to switch from an on-hook position to an off-hook position. That changes the positions of the switch elements (A) through (F) and causes a signal $\overline{CRQ}$ to change from a normal high logic ($\overline{CRQ}=1$) to a low logic ($\overline{CRQ}=0$) indicating an off-hook or call request condition.

The user then enters the first digit of a series that is to form the outbound telephone number. If the first digit is a 1 or a 0, NOR gate 110 will fail to produce an output at pin 10 and hence will not change the state of flip-flop 111. Accordingly, the logic circuit 11 will remain quiescent, blocking transmission of the associated strobe signal at NOR gate 113, which is held in a blocking state by the high logic condition at input pin (3) by the Q pin (1) output of flip-flop 111.

Upon entering a digit on key pad 17 that is authorized, NOR gate 110 will respond by sensing a logic 1 at any one of the more significant output bits D2, D3 or D4 and will responsively switch flip-flop 111 driving the Q output low (Q=0). Whenever this occurs, the NOR gate 113 is opened to transmit the low going inverted strobe pulses both to the strobe input of converter 15 and to the counter incrementing input of counter 116 as discussed in detail above. Also, the AND gate 112 will react to the change in condition at the Q or pin 1 output of flip-flop 111 and prevent the flip-flop from returning to its set state until the completion of the dialing sequence, thus allowing subsequent 0 and/or 1 digits to be effectively strobed into converter 15.

The first strobe that is associated with an authorized digit is registered in counter 116 as are the succeeding six strobe signals in this embodiment which enables seven digits to be strobed into converter 15. Upon the seventh such strobe signal, counter 116 acting through AND gate 117 gates off the transmission of strobe signals at NOR gate 113, limiting the outbound call number to the predetermined maximum of seven digits.

Thus it will be appreciated that in accordance with the invention a relatively uncomplex logic circuit that is readily adapted to the existing standard telephone set provides for a multiple mode restriction of outbound call numbers. The first mode is the requirement that the first digit be among a predetermined authorized group as sensed by a first NOR gate 110 according to the binary bit outputs of encoder 13. The second restriction mode is provided by the counter 116 that allows for only a predetermined maximum number of digits, in this particular embodiment 7, to be effectively strobed into converter 15 and hence outputted on to the telephone line.

Another feature of the invention is the ability of this modified telephone set to be connected directly to the central station service pair L1-L2 without any intervening PBX or other sophisticated computer control system or separate control unit. Power is supplied for the call restriction logic circuit 11 from the line current via the DC power drive across Zener diode 27 and filter capacitor 31 as shown in FIG. 2.

The call restriction feature cannot be easily circumvented and the telephone set with the built-in call restriction logic circuit 11 appears on the outside to be simply a standard, conventional phone set much as found in any residence or small business.

Though only a particular embodiment has been disclosed herein, it will be readily apparent to persons skilled in the art that numerous changes and modifications can be made thereto, including the use of equivalent means, devices and method steps without departing from the spirit of the invention. For example, the above described embodiment allows the dialing operation to commence upon entering a first authorized digit being any digit other than 1 or 0. This authorized group of digits can be changed by using a different logic input at the selective NOR gate 110. Thus, for example, the authorized group of digits could exclude not only 1 and 0 but also any number of additional excluded digits down to a single authorized digit. Similarly, the counter 116 and the above described embodiment is configured to count to seven and block any entered digits of a series in excess of seven. This configuration of passing seven digits to converter 15 is appropriate for most United States telephone system; however, it is apparent that different predetermined maximum counts can be established for counter 116. Thus, for example, where #9 must be entered to obtain access to a local line, and in some European countries, such as France, where the standard is eight digits for a local call; in these cases the counter 116 would be configured to close NOR gate 113 through AND gate 117 when eight digits had been strobed into converter 15.

In the above described embodiment, encoder 13 and converter 15 are separate LSI chips; however, the present invention contemplates fabrication of all three sub-circuits, encoder 13, logic circuit 11 and converter 15 into a single LSI for economy of mass manufacture and reliability.

The output of AND gate 117 while at logic low can be used to suppress the transmitter 33 until all the dialing digits have been entered and pulsed out onto the line so that hand-held audio output key pads cannot be used to circumvent the dialing restriction of logic circuit 11.

These and other changes to the circuitry and method of FIGS. 1 and 2 will be apparent to those skilled in the art and thus the present invention is to be defined only by the following claimed subject matter and equivalents.

I claim:

1. A telephone set restricted to local outbound calls and for direct connection to central station telephone lines, comprising:
    dialing means for entering a series of digits of an outbound call;
    dialing encoder means responsive to said dialing means for producing a binary encoded digit signal in response to entering of each of said series of digits and having a strobe output for producing a strove signal associated with each of said binary digit signals;
    dialing signal converter means responsive to said binary encoded digit signal and an associated strobe signal for producing a line dialing signal on the central station telephone lines; and
    logic circuit means connected between said dialing encoder means and said dialing signal converter means for
    (i) selectively gating said strobe signal form said strobe output of said dialing encoder means to said dialing signal converter means only when a first of a series of binary encoded digit signals produced by said dialing encoder means corresponds to one of a predetermined set of authorized first digits of a local outbound call, and
    (ii) thereafter selectively gating each said strobe signal associated with binary encoded digit signals subsequent to said first of the series of digits up to a predetermined maximum number of digits;
    whereby said logic circuit means selectively gates said strobe signal so as to restrict the dialing signal produced by said dialing signal converter means to phone numbers having said first number belonging to said predetermined set and limited to said predetermined maximum number of digits.

2. The telephone set of claim 1 wherein said logic circuit means further comprises means for causing said gating of each subsequent strobe signal whether or not said binary encoded digit signals following the first of the series corresponds to said predetermined set of authorized first digits.

3. The telephone set of claim 1 wherein said logic circuit means comprises means for establishing said predetermined set of authorized first digits as all digits except 1 and 0.

4. The telephone set of claim 1 wherein said logic circuit means comprises means for establishing said predetermined maximum number of digits as equal to 7.

5. The telephone set of claim 1 wherein said logic circuit means comprises:
    a first gate means having inputs connected to at least certain binary output bits of said dialing encoder means for sensing whether an entered digit of the phone number belongs to said predetermined set, and said first gate means having an output;
    second gate means having an input coupled to said strobe output of said dialing encoder means and having an output coupled to a strobe input of said dialing signal converter means for controlling by said selective gating, the transmission of said strobe signals between said dialing encoder means and said dialing signal converter means;
    bistable circuit means having set and reset states and being connected to said output of said first gate means and to another input of said second gate means, said bistable circuit means being initially disposed in the set state prior to initiating an outbound call, and being switched to the reset state by said first gate means when said first gate means senses that an entered digit belongs to said predetermined set, said second gate means blocking said strobe signal from reaching said strobe input of said dialing signal converter means when said bistable circuit means is in a set state, and transmitting said strobe signal to said strobe input of said dialing signal converter means when said bistable circuit means is in its reset state; and
    counter means connected to another input of said second gate means and to said output of said second gate means for accumulating a count of successive strobe signals transmitted by said second gate means, said counter means causing said second gate means to block further transmission of strobe signals when said count has reached said predetermined maximum number of digits and including means for resetting said counter means to zero count prior to initiating an outbound call.

6. The telephone set of claim 5 wherein said logic circuit means further comprises:
    an AND gate means connected to said bistable circuit and to said strobe output of said dialing encoder means for maintaining said bistable circuit means in its reset state through completion of entering said series of digits.

7. The telephone set of claim 5 wherein said means for resetting said counter means comprises a terminal connected to receive a call request signal and to reset said counter means in response to said call request signal.

8. The telephone set of claim 1, further comprising:
    power source means for providing dc supply power for said logic circuit means from standard supervisory line current present on the central station telephone lines, whereby said logic circuit does not require connection to an auxiliary power supply.

9. In an extension telephone set of the type adapted for direct connection to central station telephone lines, and having dialing means for entering a series of digits of an outbound call, dialing encoder means responsive to said dialing means for producing a binary encoded digit signal in response to entering of each of said series of digits and having a strobe output for producing a delayed strobe signal associated with each of said binary digit signals, and dialing signal converter means responsive to said binary encoded digit signal and an associated strobe signal for producing a line dialing signal on the central station telephone lines;
- a logic circuit for restricting outbound calls and being connected to said dialing encoder means and said dialing signal converter means, and comprising:
  - (i) selectively gating said strobe signal from said strobe output of said dialing encoder means to said dialing signal converter means only when a first of a series of binary encoded digit signals produced by said dialing encoder means corresponds to one of a predetermined set of authorized first digits of a local outbound call, and
  - (ii) thereafter selectively gating each said strobe signal associated with binary encoded digit signals subsequent to said first of the series of digits up to a predetermined maximum number of digits;
- whereby said logic circuit means selectively gates said strobe signal so as to restrict the dialing signal produced by said dialing signal converter means to phone numbers having said first number belonging to said predetermined set and limited to said predetermined maximum number of digits.

10. In the telephone set of claim 9 wherein said logic circuit further comprises means for causing said gating of each subsequent strobe signal whether or not said binary encoded digit signals following the first of the series corresponds to said predetermined set of authorized first digits.

11. In the telephone set of claim 9 wherein said logic circuit comprises means for excluding 1 and 0 from said predetermined set of authorized first digits.

12. In the telephone set of claim 9 wherein said logic circuit comprises means for establishing said predetermined maximum number of digits as equal to 7.

13. A telephone set having an outbound call restriction logic circuit comprising:
- a first gate means having inputs connected to at least certain binary output bits of a dialing encoder of the telephone set for sensing whether an entered digit of the phone number belongs to a predetermined set, and said first gate means having an output;
- a second gate means having an input coupled to the dialing encoder and having an output coupled to a dialing signal converter that converts binary encoded dialing digits into telephone line dialing pulses, said second gate means controlling the transmission of binary encoded dialing digits between said dialing encoder and said dialing signal converter;
- bistable circuit means having set and reset states and being connected to said output of said first gate means and to another input of said second gate means, said bistable circuit means being initially disposed in the set state prior to initiating an outbound call, and being switched to the reset state by said first gate means when said first gate means senses that an entered digit belongs to said predetermined set, said second gate means preventing said encoded dealing digits from being converted by said dialing signal converter when said bistable circuit means is in a set state, and permitting said conversion when said bistable circuit means is in its reset state; and
- counter means for accumulating a count of successive dialing digits converted by said converter, said counter means preventing further conversion of encoded dialing digits when the converted count has reached a predetermined maximum number of converted digits, and including means for resetting said counter means to zero count prior to initiating an outbound call.

14. The telephone set of claim 13 wherein said logic circuit means further comprises:
- an AND gate means connected to said bistable circuit and to the dialing encoder for maintaining said bistable circuit means in its reset state through completion of entering said series of digits.

15. The telephone set of claim 13 wherein said means for resetting said counter means comprises means connected to receive a call request signal.

16. The telephone set of claim 13, further comprising:
- power source means for providing dc supply power for said logic circuit means from standard supervisory line current present on the central station telephone lines, whereby said logic circuit does not require connection to an auxiliary power supply.

17. A telephone set restricted to local outbound calls and for direct connection to central station telephone lines, comprising:
- dialing means for entering a series of digits of an outbound call;
- dialing encoder means responsive to said dialing means for producing in response to entering of each of said series of digits, a binary encoded digit signal and having a strobe output for producing a strobe signal associated with each of said binary digit signals;
- dialing signal converter means responsive to said binary encoded digit signal and an associated strobe signal for producing a line dialing signal on the central station telephone lines; and
- logic circuit means connected between said dialing encoder means and said dialing signal converter means for
  - (i) selectively gating said strobe signal from said strobe output of said dialing encoder means to said dialing signal converter means when a first of a series of binary encoded digit signals that is produced by said dialing encoder means corresponds to one of a predetermined set of authorized first digits of a local outbound call, and
  - (ii) selectively gating each subsequent said strobe signal associated with binary encoded digit signals following said first of the series of digits up to a predetermined maximum number;
- whereby said logic circuit means selectively gates said strobe signal so as to restrict the dialing signal produced by said dialing signal converter means to phone numbers having said first number belonging to said predetermined set and having said predetermined maximum number of digits, said logic means comprising:
  - (iii) a first gate means having inputs connected to at least certain binary output bits of said dialing encoder means for sensing whether an entered digit of the phone number belongs to said predetermined set, and said first gate means having an output;

(iv) second gate means having an input coupled to said strobe output of said dialing encoder means and having an output coupled to a strobe input of said dialing signal converter means for controlling by said selective gating, the transmission of said strobe signals between said dialing encoder means and said dialing signal converter means;

(v) bistable circuit means having set and reset states and being connected to said output of said first gate means and to another input of said second gate means, said bistable circuit means being initially disposed in the set state prior to initiating an outbound call, and being switched to the reset state by said first gate means when said first gate means senses that an entered digit belongs to said predetermined set, said second gate means blocking said strobe signal from reaching said strobe input of said dialing signal converter means when said bistable circuit means is in a set state, and transmitting said strobe signal to said strobe input of said dialing signal converter means when said bistable circuit means is in its reset state; and (vi) counter means connected to another input of said second gate means and to said output of said second gate means for accumulating a count of successive strobe signals transmitted by said second gate means, said counter means causing said second gate means to block further transmission of strobe signals when said count has reached said predetermined maximum number of digits and including means for resetting said counter means to zero count prior to initiating an outbound call.

18. The telephone set of claim 17 wherein said logic circuit means further comprises:
an AND gate means connected to said bistable circuit and to said strobe output of said dialing encoder means for maintaining said bistable circuit means in its reset state through completion of entering said series of digits.

19. The telephone set of claim 17 wherein said means for resetting said counter means comprises a terminal connected to receive a call request signal and to reset said counter means in response to said call request signal.

20. A telephone set restricted to local outbound calls and for direct connection to central station telephone lines, comprising:
dialing means for entering a series of digits of an outbound call;
dialing encoder means responsive to said dialing means for producing in response to entering of each of said series of digits and having a strobe output for producing a strobe signal associated with each of said binary digit signals;
dialing signal converter means responsive to said binary encoded digit signal and an associated strobe signal for producing a line dialing signal on the central station telephone lines; and
logic circuit means connected between said dialing encoder means and said dialing signal converter means for
(i) selectively gating said strobe signal from said strobe output of said dialing encoder means to said dialing signal converter means when a first of a series of binary encoded digit signals that is produced by said dialing encoder means corresponds to one of a predetermined set of authorized first digits of a local outbound call, said logic circuit having gate means connected to certain binary output bits of said dialing encoder corresponding to said predetermined set of authorized first digits for enabling the selective gating of said strobe signal associated with said first of a series of digits, and
(ii) selectively gating each said strobe signal associated with binary encoded digit signals following said first of the series of digits up to a predetermined maximum number wherein said logic circuit means has counter means for accumulating a count of strobe signals associated with successive encoded digit signals converted by said dialing signal converter means to prevent conversion of said binary encoded digit signals after said predetermined maximum number;
whereby said logic circuit means selectively gates said strobe signal so as to restrict the dialing signal produced by said dialing signal converter means to phone numbers having said first number belonging to said predetermined set and limited to said predetermined maximum number of digits.

* * * * *